United States Patent
Tanaka et al.

(10) Patent No.: US 8,089,193 B2
(45) Date of Patent: Jan. 3, 2012

(54) AUTOMOTIVE ALTERNATOR HAVING BRUSH DEVICE COVERED WITH SURROUNDING WALL

(75) Inventors: Akihiro Tanaka, Anjo (JP); Hiroshi Ishida, Anjo (JP)

(73) Assignee: Denso Corporation, Kariya (JP)

( * ) Notice: Subject to any disclaimer, the term of this patent is extended or adjusted under 35 U.S.C. 154(b) by 513 days.

(21) Appl. No.: 12/219,370

(22) Filed: Jul. 21, 2008

(65) Prior Publication Data

US 2009/0115274 A1    May 7, 2009

(30) Foreign Application Priority Data

Nov. 1, 2007  (JP) ................................ 2007-285445
Mar. 3, 2008  (JP) ................................ 2008-051804

(51) Int. Cl.
  *H01R 39/38*  (2006.01)
  *H02K 13/00*  (2006.01)
(52) U.S. Cl. ........... 310/239; 310/89; 310/242; 310/248
(58) Field of Classification Search .................. 310/239, 310/89, 242, 248
See application file for complete search history.

(56) References Cited

U.S. PATENT DOCUMENTS

| | | | | |
|---|---|---|---|---|
| 4,705,983 | A * | 11/1987 | Franz et al. ................ | 310/68 D |
| 6,294,856 | B1 * | 9/2001 | Ishida et al. .................... | 310/232 |
| 6,333,580 | B1 * | 12/2001 | Steinbart et al. ............. | 310/239 |
| 6,486,584 | B2 * | 11/2002 | Chang .......................... | 310/239 |
| 6,515,398 | B1 * | 2/2003 | Fudono et al. ................ | 310/239 |
| 6,664,699 | B2 * | 12/2003 | Shioya et al. .................. | 310/239 |
| 6,710,499 | B2 | 3/2004 | Tsuge | |
| 2002/0047470 | A1 * | 4/2002 | Shioya et al. .................. | 310/239 |
| 2003/0042813 | A1 * | 3/2003 | Morikaku et al. .............. | 310/91 |
| 2005/0110352 | A1 | 5/2005 | Utsumi et al. | |
| 2005/0280330 | A1 * | 12/2005 | Mashino ....................... | 310/239 |
| 2006/0082233 | A1 * | 4/2006 | Sugitani et al. ................ | 310/85 |
| 2006/0273685 | A1 | 12/2006 | Wada et al. | |

FOREIGN PATENT DOCUMENTS

| | | |
|---|---|---|
| JP | A-2002-359951 | 12/2002 |
| JP | A-2005-160135 | 6/2005 |
| JP | A-2006-340467 | 12/2006 |

OTHER PUBLICATIONS

Notice of Rejection for Japanese Patent Application No. 2008-051804, Jun. 23, 2009, 4 pp. (w/ English Translation).

* cited by examiner

*Primary Examiner* — Quyen Leung
*Assistant Examiner* — Alex W Mok
(74) *Attorney, Agent, or Firm* — Oliff & Berridge, PLC

(57) ABSTRACT

An alternator for generating electric power is mounted on an automotive vehicle. The alternator includes a housing, a stator fixed in the housing, a rotor driven by an engine of the automotive vehicle, and electric components such as a brush holder. The brush holder is mounted on a rear surface of a rear frame constituting the housing and is covered with a rear cover fixed to the rear frame. The rear cover includes a surrounding wall covering the brush device to prevent water from reaching a brush area. The surrounding wall is composed of plural partial walls having respective radiuses from a rotational axis of the rotor. The surrounding wall may be continuously made by the partial walls. Alternatively, openings for draining water may be formed in the partial walls positioned downward of the rotational axis of the rotor.

8 Claims, 5 Drawing Sheets

FRONT SIDE ← → REAR SIDE

AUTOMOTIVE ALTERNATOR HAVING BRUSH DEVICE COVERED WITH SURROUNDING WALL

CROSS-REFERENCE TO RELATED APPLICATIONS

This application is based upon and claims benefit of priority of Japanese Patent Applications No. 2007-285445 filed on Nov. 1, 2007 and No. 2008-51804 filed on Mar. 3, 2008, the contents of which are incorporated herein by reference.

BACKGROUND OF THE INVENTION

1. Field of the Invention

The present invention relates to an alternator for use in an automotive vehicle.

2. Description of Related Art

An alternator having a brush device including a slip-ring cover, along a circumferential direction of which an air passage is formed, has been known hitherto. An example of such an alternator is shown in JP-A-2002-359951. Water is prevented from entering portions around the slip-ring by making such an air passage.

However, in the conventional alternator, water entering through a rear cover is not prevented although water entering into the brush device composed of a brush holder and a slip-ring cover is suppressed. If a large amount of water enters through the rear cover, water may enter into the brush device through the air passage formed around the slip-ring cover, or the air passage may be closed by the water. When the air passage is closed, temperature around brushes may become high.

SUMMARY OF THE INVENTION

The present invention has been made in view of the above-mentioned problem, and an object of the present invention is to provide an improved automotive alternator, in which water is prevented from entering into a brush area and a temperature rise around the brushes is suppressed.

The alternator according to the present invention is advantageously used in an automotive vehicle. The alternator includes a front frame, a rear frame, a stator firmly held between the frames, a rotor rotatably supported in the stator, electrical components such as brush device mounted on a rear surface of the rear frame, and a rear cover covering the electrical components. The rotor is driven by an engine of an automotive vehicle via a belt coupled to a pulley connected to a rotor shaft.

The rear cover includes a surrounding wall that stands from a rear wall of the rear cover toward the rear surface of the rear frame. The brush device composed of brushes, a brush holder and a slip-ring cover is surrounded by the surrounding wall to prevent water from entering into a brush area. The surrounding wall is composed of plural partial walls having respective radiuses from a rotational axis of the rotor. The surrounding wall may be continuously formed by the plural partial walls. An air ventilation passage may be formed in a slip-ring cover covering slip-rings connected to the rotor shaft.

Windows for introducing cooling air into the alternator may be made in the rear cover outside of the surrounding wall. Water entering into the brush area is prevented by making the windows outside the surrounding wall. Some of the partial walls constituting the surrounding wall may be positioned downward of the rotational axis of the rotor and may include openings to drain water entered into an inner space of the surrounding wall. A front end of the surrounding wall may be abutted to the rear surface of the rear frame via a sealing member to surely prevent water from entering into the brush area. Further, a pair of air passages communicating with the inner space of the surrounding wall may be formed in the rear cover and may be connected to an intake/exhaust device of the vehicle in order to surely reduce temperature around the brushes by circulating cooling air.

According to the present invention, water reaching the brush area through the rear cover is surely prevented by the surrounding wall formed on the rear cover while suppressing a temperature rise around the brushes. Other objects and features of the present invention will become more readily apparent from a better understanding of the preferred embodiment described below with reference to the following drawings.

DETAILED DESCRIPTION OF THE PREFERRED EMBODIMENT

Figure 1:
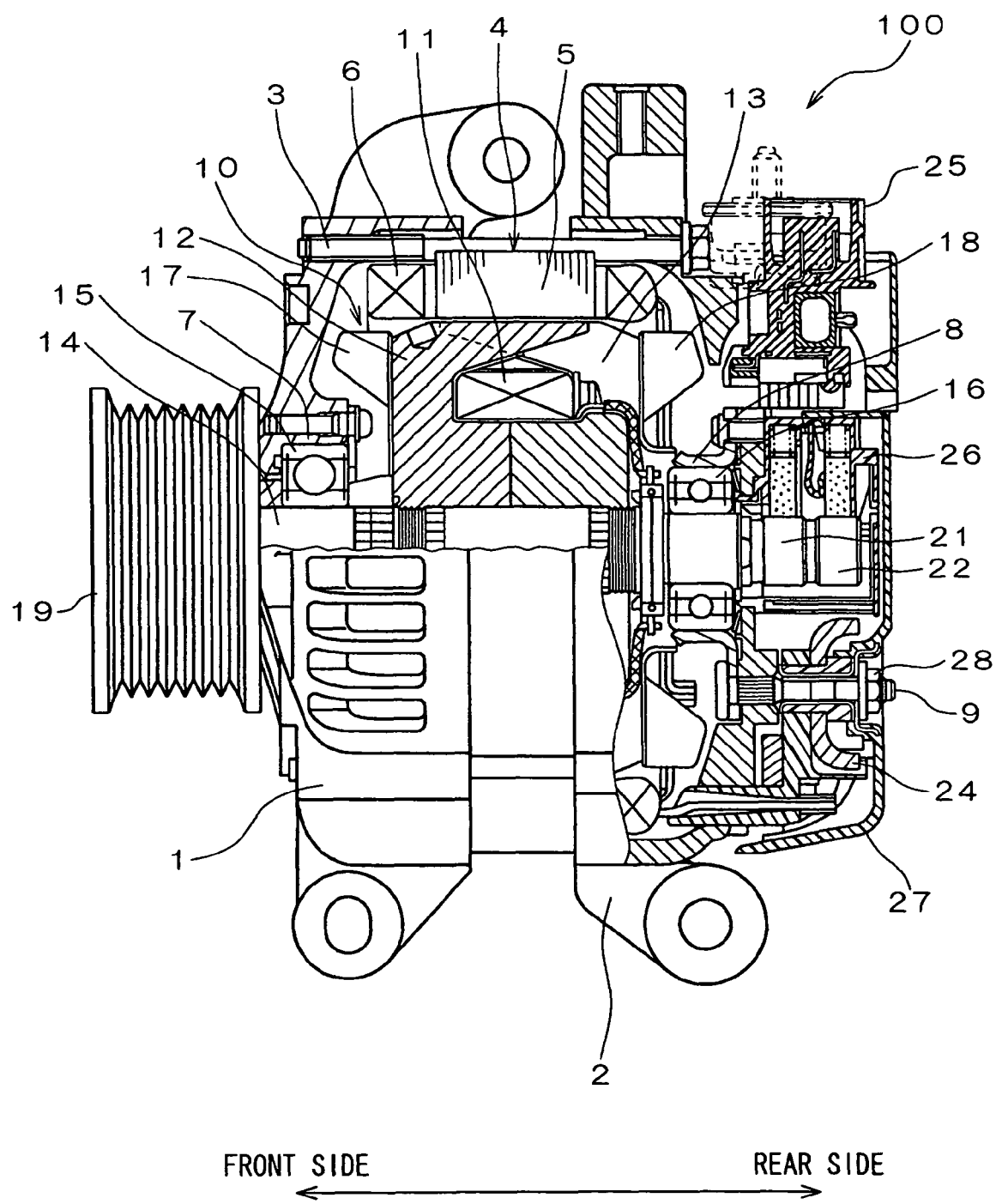
FIG. 1 is a cross-sectional view showing an entire structure of an automotive alternator according to the present invention.

A preferred embodiment of the present invention will be described with reference to accompanying drawings. An alternator 100 shown in FIG. 1 is mounted on an automotive vehicle for generating electric power for the vehicle. The alternator 100 includes a housing composed of a front frame 1 and a rear frame 2, a stator 4, a rotor 10, a rectifier 24, a voltage regulator 25, a brush device 26 and a rear cover 27. The left side of FIG. 1 is referred to as a front side and the right side thereof is referred to as a rear side, as shown in FIG. 1 with an arrow mark.

Both of the front frame 1 and the rear frame 2 are cup-shaped, and a cylindrical stator 4 is sandwiched between both frames 1, 2. The stator 4 and the frames 1, 2 are fixed to one another by plural bolts 3. A bearing box 7 is integrally formed with the front frame 1, and a bearing box 8 made of iron is connected to the rear frame 2 by bolts 9 having knurls.

The stator 4 is composed of a stator core 5 and a stator winding 6 wound in the stator core 5. The rotor 10 is composed of a rotor shaft 14, pole cores 12, 13 connected to the rotor shaft and a field winding 11 disposed between the pole cores. The rotor 10 is rotatably supported by bearings 15, 16 disposed in the respective bearing boxes 7, 8. Centrifugal type cooling fans 17, 18 are connected, respectively, to axial end surfaces of the pole cores 12, 13. A pulley 19 is connected to a front end of the rotor shaft 14 with a nut. The pulley 19 is driven by an automotive engine via a V-belt or the like. At rear end of the rotor shaft 14, a pair of slip-rings 21, 22 is formed and electrically connected to the field winding 11.

Electrical components including the rectifier 24, voltage regulator 25 and the brush devices 26 are mounted on a rear surface of the rear frame 2 with bolts 9 or other fixing means. The rectifier 24 rectifies three-phase alternating current generated in the stator winding 6 and outputs direct current. The voltage regulator 25 regulates an output voltage of the alternator by controlling an amount of field current supplied to the field winding 11. The brush device 26 includes brushes 51, 52 (refer to FIG. 3) slidably contacting the slip-rings 21, 22. Field current is supplied to the field winding 11 from the rectifier 24 through the brushes 51, 52.

The rear cover 27 made of a resin material covers and protects the electric components, such as the rectifier 24, the voltage regulator 25 and the brush devices 26, mounted on the rear surface of the rear frame 2. The rear cover 27 is connected to the rear cover 2 by fastening nuts 28 to bolts 9 extending from the rear cover 2. The rectifier 24 is sandwiched between the rear frame 2 and the rear cover 27. The rear cover 27 will be described later in detail.

The alternator 100 described above is driven by an automotive engine through a belt coupling the pulley 19 and the engine. When the rotor 10 rotates while field current is supplied to the field coil 11, three-phase alternating current is generated in the stator winding 6. The alternating current is rectified into direct current by the rectifier 24. Direct current is supplied to an on-board battery and other electric devices from output terminals of the rectifier 24.

Figure 2:
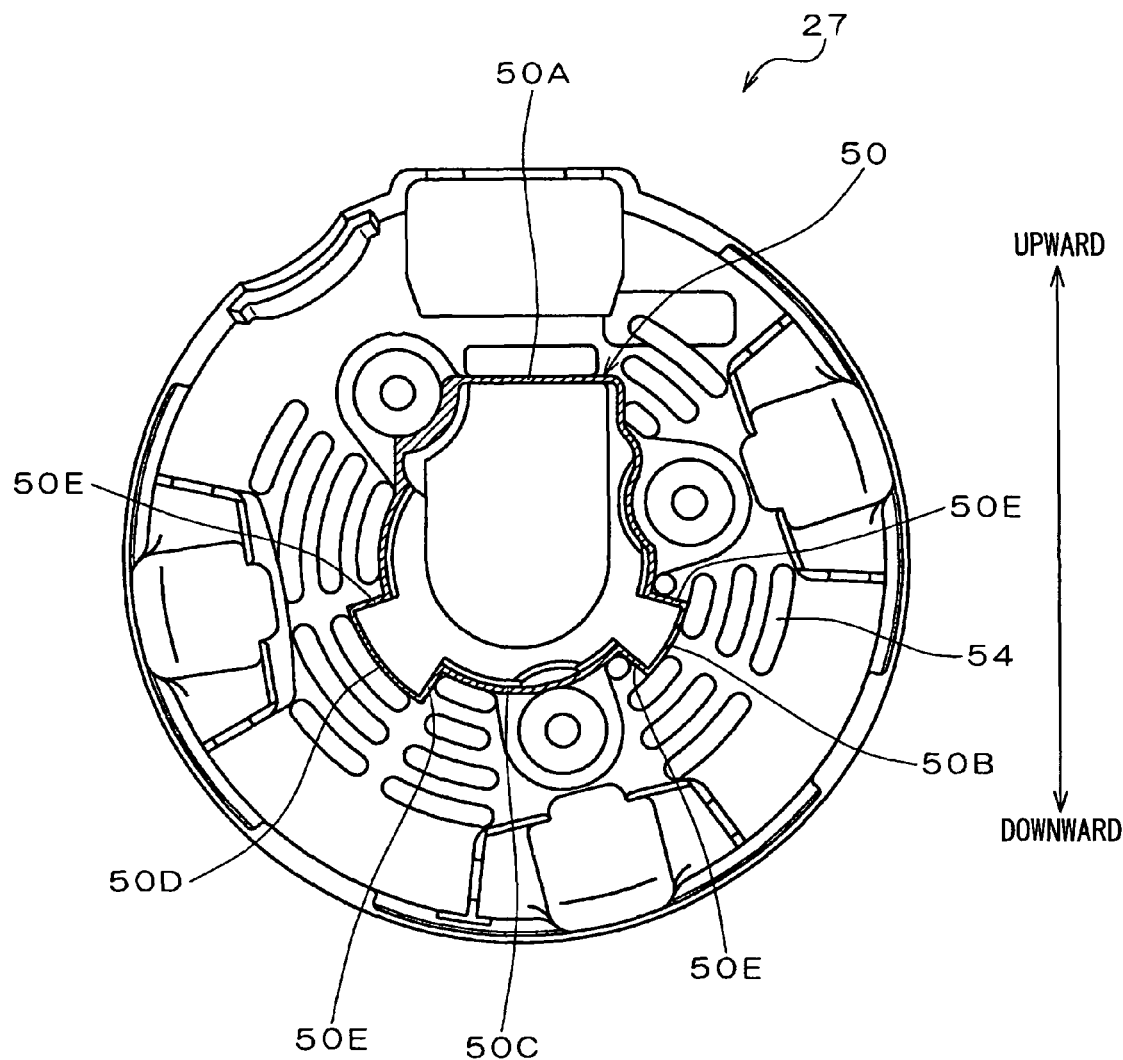
FIG. 2 is a plan view showing a rear cover covering components mounted on a rear surface of a rear frame, viewed from a front side (from an inside of the alternator)

Referring to FIG. 2, the rear cover 27 will be described. FIG. 2 shows a plan view of the rear cover 27, viewed from the front side of the alternator (from an inside of the alternator). A surrounding wall 50 standing from a rear wall of the rear cover 27 in the axial direction is formed integrally with the rear cover. The surround wall 50 surrounds the brush device 26 when the rear cover is connected to the rear frame 2. In FIG. 2, the surrounding wall 50 is shown by hatching to distinguish it from other portions.

The surrounding wall 50 is composed of plural partial walls 50A, 50B, 50C, 50D and 50E, which are continuously connected without interruption. A portion of the partial wall 50A and the partial wall 50C are circular arcs having a first radius from the rotational axis of the rotor 10. The partial walls 50B and 50D are circular arcs having a second radius larger than the first radius. The partial walls 50A, 50B, 50C and 50D are connected by partial walls 50E extending in the radial direction. The partial walls 50B, 50C and 50D are positioned downward of the rotational axis of the rotor when the alternator 100 is mounted on the vehicle. Windows 54 for introducing cooling air are formed at radial outside positions of the partial walls 50A-50D.

Figure 3:
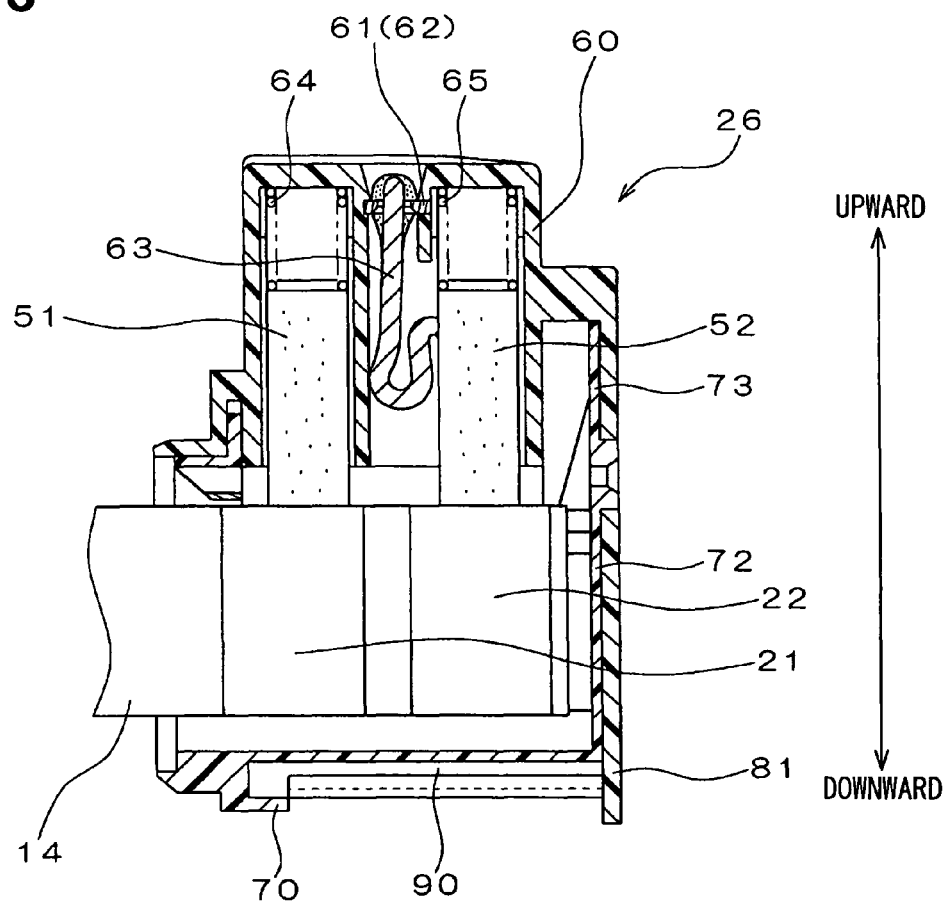
FIG. 3 is a cross-sectional view showing a brush device used in the automotive alternator, in an enlarged scale.
Figure 4:
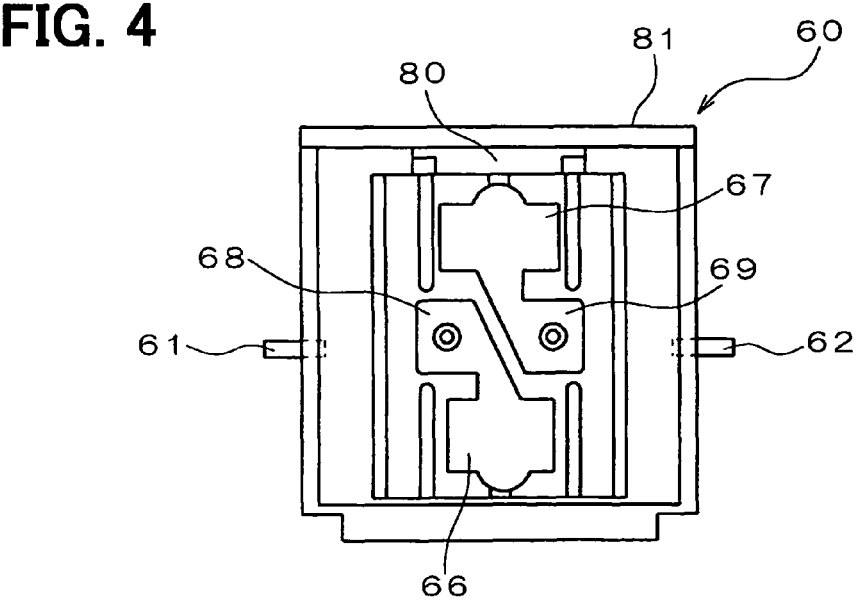
FIG. 4 is a plan view showing a brush holder used in the brush device, viewed from a rotational axis of a rotor shaft.

Referring to FIGS. 3 and 4, the brush device 26 surrounded by the surrounding wall 50 when the brush device 26 is covered with the rear cover 27 will be described. FIG. 3 shows the brush device 26 when it is mounted on the rear frame 2. FIG. 4 shows a brush holder 60 used in the brush device 26, viewed in the radial direction from the slip-rings 21, 22. The brush device 26 is composed of the brush holder 60 made of a resin material having connecting terminals 61, 62 embedded therein and a pair of brushes 51, 52 having pig tails 63, a slip-ring cover 70 made of a resin material, and springs 64, 65. The brushes 51, 52 are electrically connected to the connecting terminals 61, 62 through the pig tails 63.

The brush holder 60 is substantially box-shaped. The brush holder 60 includes a pair of brush-containing spaces 66, 67 for containing the brushes 51, 52 therein, a pair of pig tail spaces 68, 69 for containing the pig tails 63 therein, and a groove 80 into which a rear end wall 73 of the slip-ring cover 70 is inserted. These portions of the brush holder 60 are open toward the slip-rings 21, 22. The brush holder 60 also includes an end wall 81 for closing the rear end of the rotor shaft 14.

The slip-ring cover 70 is coupled to the brush holder 60 by engaging a projection formed on a rear end wall 72 of the slip-ring cover 70 with a hole formed in the end wall 81 of the brush holder 60. Thus, the slip-ring cover 70 is easily and hermetically connected to the brush holder 60. An air passage 90 is formed in the slip-ring cover 70 at a position that is downward of the slip-rings 21, 22 when the alternator 100 is mounted on the vehicle.

Advantages attained in the embodiment described above will be summarized below. Since the brush device 26 are surrounded by the surrounding wall 50, water is prevented from entering into a space around the brushes. Since the air passage 90 open to outside is formed in the brush device 26, air around the brushes at high temperature is not retained around the brushes. Accordingly, temperature around the brushes can be lowered. Since the partial walls 50B, 50D having a larger radius are positioned apart from the brush device 26, water entered into a space between the surrounding wall 50 and the brush device 26 is prevented from being retained therein.

Since the surrounding wall 50 are positioned at an radial inside of the windows 54 for introducing cooling air, water entered from the windows 54 is surely prevented from entering into an inside of the surrounding wall 50. Since the surrounding wall 50 is continuously formed without interruption, water is prevented from entering into the inside space of the surrounding wall 50.

Figure 5:
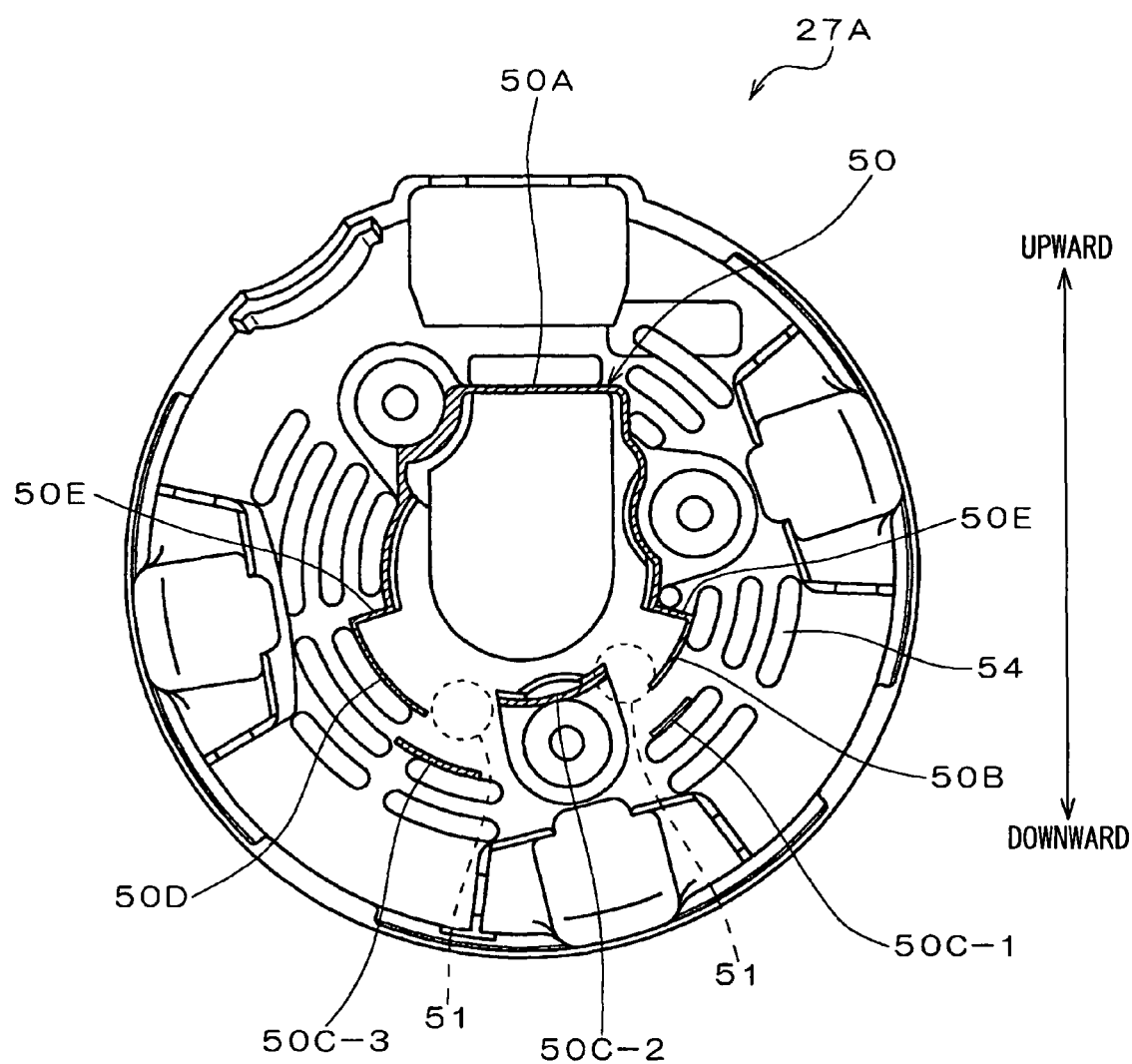
FIG. 5 is a plan view showing a modified form of the rear cover, viewed from the inside of the alternator.

The present invention is not limited to the embodiment described above, but it may be variously modified. For example, openings 51 may be formed in the surrounding wall 50 as shown in FIG. 5. In this modified form, the rear cover 27 are modified to a rear cover 27A, and the partial wall 50C shown in FIG. 2 is divided into three portions, 50C-1, 50C-2 and 50C3. The wall portions 50C-1 and 50C-3 have a radius larger than the radius of the wall portion 50C-2. Openings 51 are formed between these wall portions, as shown in FIG. 5, making the surrounding wall 50 non-continuous. The openings 51 are formed so that they are positioned downward of the rotational axis of the rotor shaft 14 when the alternator 100 is mounted on the vehicle. Water entered into the inside space of the surrounding wall 50 for some reasons can be easily drained from the openings 51 while preventing the water from entering into the brush device 26.

Figure 6:
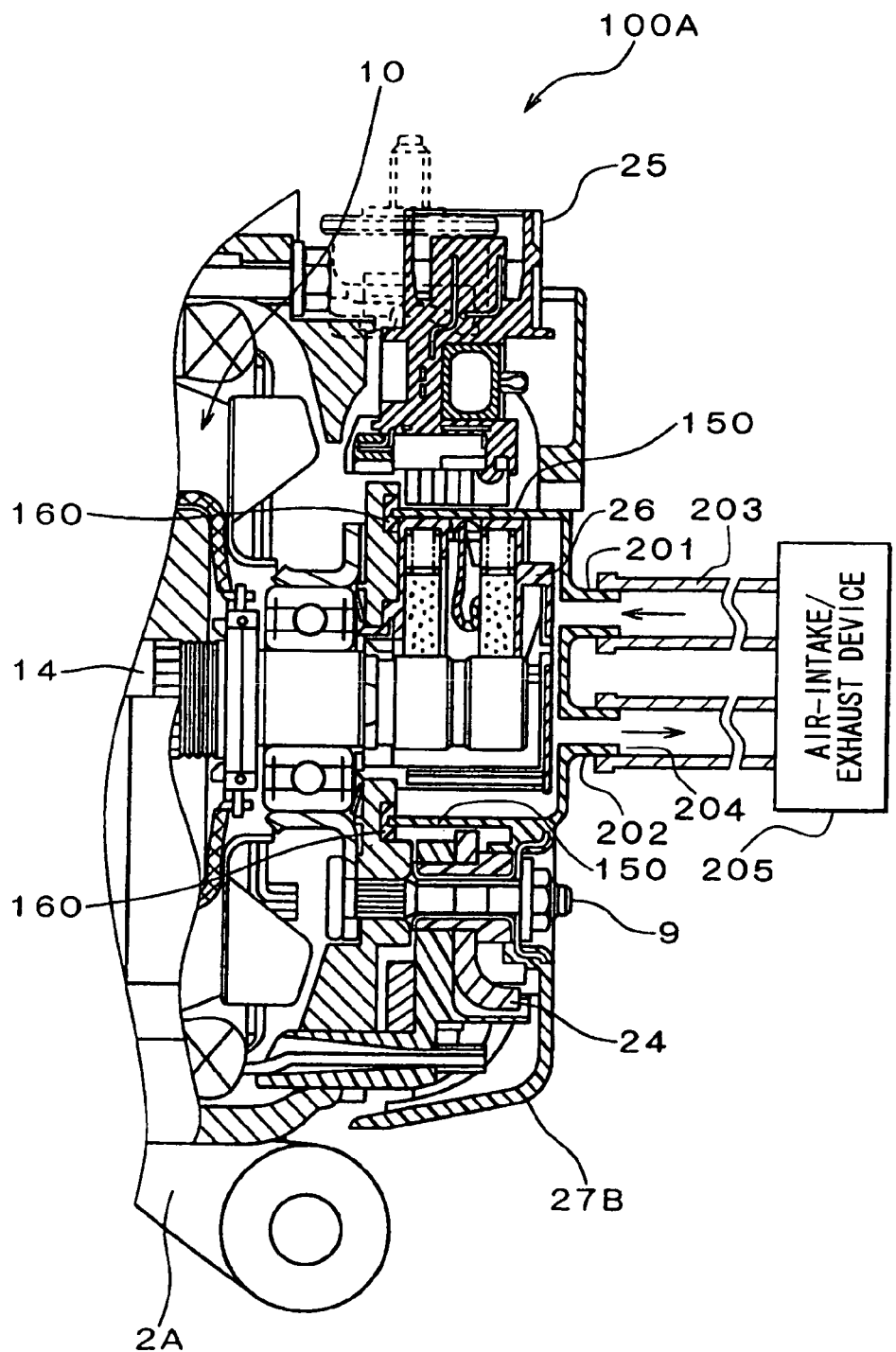
FIG. 6 is a partial cross-sectional view showing the automotive alternator having a modified form of the rear cover.

An alternator 100A having a modified rear frame 2A and a modified rear cover 27B is shown in FIG. 6. The rear cover 27B includes a partition wall 150 separating the brush device 26 from other air passages for electric components such as the rectifier 24. The partition wall 150 standing from the rear wall of the rear cover 27B in the axial direction is integrally formed with the rear cover 27B. A front end of the partition wall 150 abuts with the rear surface of the rear frame 2A with a seal member 160 interposed therebetween. In this manner, the brush device 26 is separated from other air passages.

Further, a pair of cylindrical air passages 201, 202 is formed in the rear wall of the rear cover 27B. The cylindrical air passages 201, 202 extending in the axial direction circulate cooling air between the space in the partition wall 150 and the outside. The cylindrical air passages 201, 202 are connected to an air-intake/exhaust device of the vehicle 205 via an intermediate member 203 or 204. In this manner, foreign particles are surely prevented from entering into the space around the brush device 26, and brush powders are well exhausted to the outside. The life of brushes is extended by reducing temperature of the brushes.

While the present invention has been shown and described with reference to the foregoing preferred embodiment and modified forms, it will be apparent to those skilled in the art that changes in form and detail may be made therein without departing from the scope of the invention as defined in the appended claims.

What is claimed is:

1. An alternator for use in an automotive vehicle comprising:
    a housing composed of a front frame and a rear frame;
    a stator fixed in the housing;
    a rotor rotatably disposed in the stator, the rotor including slip-rings;
    a brush device supporting brushes slidably contacting the slip-rings, the brush device including a slip ring cover covering the slip-rings; and
    a rear cover covering the brush device and other electric components mounted on a rear surface of the rear frame, the rear cover being connected to the rear frame, wherein:
    the rear cover includes a surrounding wall surrounding the brush device, the surrounding wall including a plurality of partial walls having respective radiuses from a rotational axis of the rotor; and
    some of the plurality of partial walls are positioned downward of the rotational axis of the rotor when the alternator is mounted on the automotive vehicle,
    wherein the rear cover includes a plurality of windows for introducing cooling air, the windows being positioned radial outside of the surrounding wall,
    the rear cover and the rear frame provide a space for the brush device, and
    the plurality of windows are provided to introduce the cooling air into the space.

2. The alternator as in claim 1, wherein:
    the partial walls positioned downward of the rotational axis of the rotor include openings.

3. The alternator as in claim 1, wherein:
    the surrounding wall is continuously formed without interruption.

4. The alternator as in claim 1, wherein:
    the plurality of the partial walls extend in an axial direction toward the rear frame of the housing; and
    a radius of the some of the plurality of partial walls is larger than that of the other of the plurality of partial walls.

5. The alternator as in claim 4, wherein:
    the surrounding wall surrounds both the brush device and a rotor shaft;
    the brush device is located upward of the rotor shaft; and
    the some of the plurality of partial walls are located downward of the rotor shaft.

6. An alternator for use in an automotive vehicle comprising:
    a housing composed of a front frame and a rear frame;
    a stator fixed in the housing;
    a rotor rotatably disposed in the stator, the rotor including slip-rings;
    a brush device supporting brushes slidably contacting the slip-rings, the brush device including a slip ring cover covering the slip-rings; and
    a rear cover covering the brush device and other electric components mounted on a rear surface of the rear frame, the rear cover being connected to the rear frame, wherein:
    the rear cover includes a surrounding wall surrounding the brush device, the surrounding wall including a plurality of partial walls having respective radiuses from a rotational axis of the rotor; and
    some of the plurality of partial walls are positioned downward of the rotational axis of the rotor when the alternator is mounted on the automotive vehicle,
    wherein the partial walls positioned downward of the rotational axis of the rotor include openings and the openings are provided between the partial walls to drain water from an inside to an outside of the surrounding wall.

7. An alternator for use in an automotive vehicle comprising:
    a housing composed of a front frame and a rear frame;
    a stator fixed in the housing;
    a rotor rotatably disposed in the stator, the rotor including slip-rings;
    a brush device supporting brushes slidably contacting the slip-rings, the brush device including a slip ring cover covering the slip-rings; and
    a rear cover covering the brush device and other electric components mounted on a rear surface of the rear frame, the rear cover being connected to the rear frame, wherein:
    the rear cover includes a surrounding wall surrounding the brush device, the surrounding wall including a plurality of partial walls having respective radiuses from a rotational axis of the rotor; and
    some of the plurality of partial walls are positioned downward of the rotational axis of the rotor when the alternator is mounted on the automotive vehicle,
    wherein the plurality of the partial walls extend in an axial direction toward the rear frame of the housing,
    a radius of the some of the plurality of partial walls is larger than that of the other of the plurality of partial walls, and
    the rear cover includes a rear wall on which the surrounding wall is disposed, the rear wall is larger in diameter than the surrounding wall, and the partial walls extend from the rear wall toward the rear frame.

8. The alternator as in claim 7, wherein
    the rear cover includes a plurality of windows for introducing cooling air, the windows being positioned radial outside of the surrounding wall, and
    the partial walls positioned downward of the rotational axis of the rotor include openings.

* * * * *